May 31, 1966 A. W. HINKSON 3,253,364
TOY VEHICLE REMOTE CONTROL DEVICE
Filed March 20, 1963 7 Sheets-Sheet 1

INVENTOR.
ARTHUR W. HINKSON
BY
ATTORNEY

May 31, 1966        A. W. HINKSON        3,253,364

TOY VEHICLE REMOTE CONTROL DEVICE

Filed March 20, 1963        7 Sheets-Sheet 2

INVENTOR.
ARTHUR W. HINKSON

BY *Bradley Cohn*

ATTORNEY

May 31, 1966  A. W. HINKSON  3,253,364

TOY VEHICLE REMOTE CONTROL DEVICE

Filed March 20, 1963  7 Sheets-Sheet 3

INVENTOR.
ARTHUR W. HINKSON
BY
ATTORNEY

May 31, 1966 A. W. HINKSON 3,253,364
TOY VEHICLE REMOTE CONTROL DEVICE
Filed March 20, 1963 7 Sheets-Sheet 4

FIG. 8

INVENTOR.
ARTHUR W. HINKSON
BY
ATTORNEY

May 31, 1966 A. W. HINKSON 3,253,364
TOY VEHICLE REMOTE CONTROL DEVICE
Filed March 20, 1963 7 Sheets-Sheet 5

INVENTOR.
ARTHUR W. HINKSON
BY
ATTORNEY

May 31, 1966  A. W. HINKSON  3,253,364
TOY VEHICLE REMOTE CONTROL DEVICE
Filed March 20, 1963  7 Sheets-Sheet 6

INVENTOR.
ARTHUR W. HINKSON
BY
ATTORNEY

May 31, 1966 A. W. HINKSON 3,253,364
TOY VEHICLE REMOTE CONTROL DEVICE
Filed March 20, 1963 7 Sheets-Sheet 7

INVENTOR.
ARTHUR W. HINKSON

BY

ATTORNEY

United States Patent Office 3,253,364
Patented May 31, 1966

3,253,364
TOY VEHICLE REMOTE CONTROL DEVICE
Arthur W. Hinkson, 537 Union Ave., Westbury, N.Y.
Filed Mar. 20, 1963, Ser. No. 266,731
7 Claims. (Cl. 46—240)

The object of this invention is to provide an amusement device or game.

More particularly, the invention provides for simulating the operation of a moving vehicle such as an automobile, airplane, boat, wagon, carriage, train, animal, figurines or the like.

It is a particular object of the invention to provide an apparatus which will simulate the movement of a vehicle such as an automobile along roads, tracks or other patterns at the will of the operator.

It is an object of the invention to provide a method and means for controlling a vehicle remotely from selective vehicle controls by which the vehicle may arbitrarily be turned, stopped, reversed, accelerated and decelerated.

A further object of the invention is to provide a means for operating a vehicle anywhere within the confines of the apparatus without regard to any predetermined path or track other than may be arbitrarily selected by the operator or designated for amusement or skill.

It is an object of the invention to provide an apparatus in which various landscapes may be readily substituted one for the other and over which the vehicle may be operated depending on the skill or desires of the operator.

It is a further object of the invention to provide a means for duplicating the control means of the apparatus so that more than one vehicle may be operated by more than one person to permit competitive amusement or sport.

It is an object of the invention to provide a planar system in which X and Y coordinates may be selectively controlled to move a member along either or both coordinates at the whim and will of the operator.

It is a further object of the invention to provide an operative connection (which may be mechanical or magnetic) between such moving member and a toy vehicle so that a landscape of an arbitrary pattern may be located with reference to the vehicle and the vehicle caused to move relative to the landscape as desired.

It is an object of the invention to provide various means within the scope of the invention for automatically or semiautomatically controlling a moving point by varying X and Y coordinates by a control such as a steering wheel or like device.

It is within the scope of the invention to provide a means which accurately simulates the steering of a land vehicle such as an automobile as well as to provide controls that simulate turning movements such as would be experienced by an aircraft or submarine in its turning moment in a plane.

Other objects and advantages of the invention as well as the features of construction, combination and arrangement of the parts thereof will be more fully understood from the following description of a preferred embodiment taken in conjunction with the accompanying drawings in which.

Figure 1:
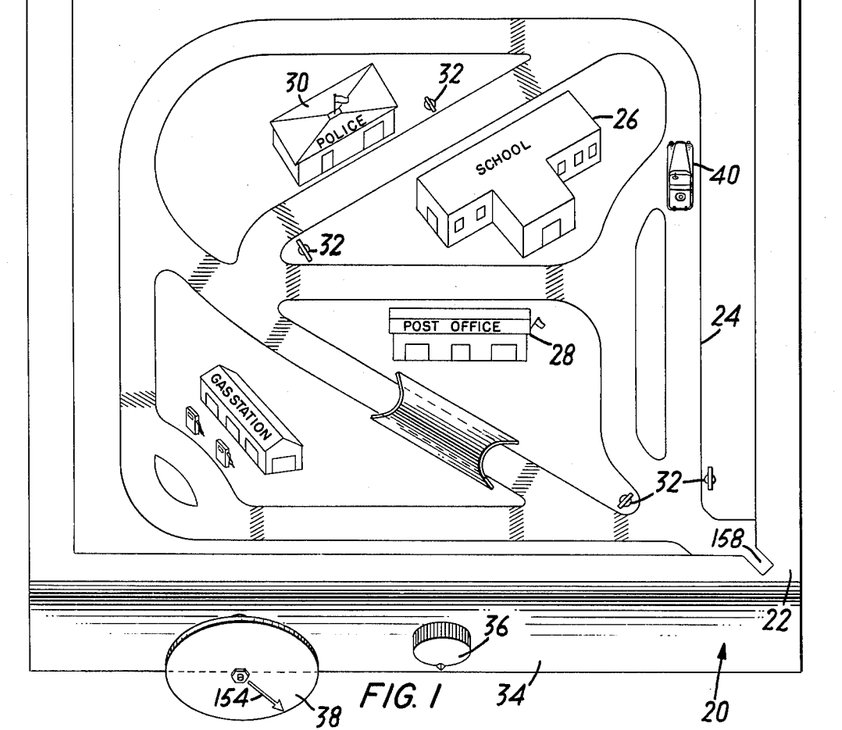
FIG. 1 is a perspective plan view of an embodiment of the invention.

Referring to the drawings:

FIG. 1 illustrates a box 20 containing an operating mechanism of the device and supporting on its top a plate or card 22 on which may be drawn a landscape having a route 24. Three-dimensional cultural features, such as the school 26, the post office 28, the police station 30 and the signs 32 may be positioned on the planar landscape. It should be noted that within reason, the landscape need not be absolutely planar but may contain slight elevations as will be hereinafter understood.

On the front riser 34 of the box 20 there may be conveniently mounted the on and off power control 36 and the steering wheel 38. By the novel means hereinafter explained, a vehicle 40 may be operated by the controls 36 and 38, control 36 controlling the application of power and the steering wheel 38 controlling the steering guidance for the vehicle.

Figures 2, 3:
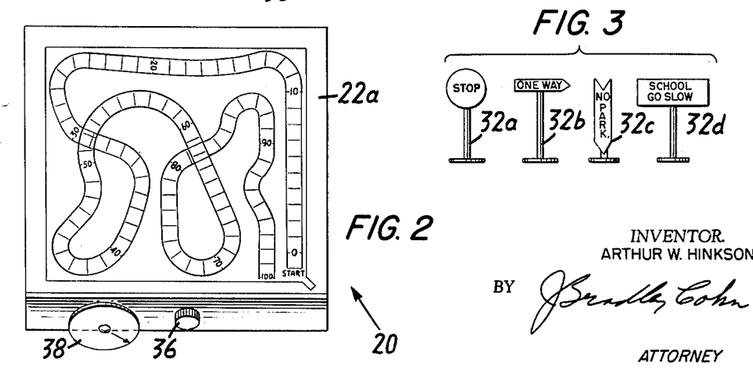
FIG. 2 is the same reduced in size with a substitute landscape.
FIG. 3 illustrates in elevation the type of signs or other cultural features that may be selectively positioned about the landscape.

FIG. 2 shows the embodiment of FIG. 1 in which the card, or plate, 22 is replaced by a card 22a depicting a maze over which the operator is able to steer the vehicle by operating the controls 36, 38.

The three-dimensional cultural features 32, 32a, 32b, 32c, and 32d may be added to the landscape as desired.

Refer now to FIGS. 4–7, the housing or box 20 comprises a bottom 42, a front 34, a right (FIG. 5) side 44, a left side 46 and a rear side 48. The housing or box is closed on the top by a topographic card or plate 22 or 22a. Just beneath the top plate, or card, 22 there is mounted the Y coordinate operating rib 50 and the X coordinate operating rib 52. The rib 50 is supported at each end on the thin wire tracks 54 for parallel sliding motion in the Y direction, that is to and from between the front 34 and rear 48 and parallel thereto. In like fashion, the X coordinate rib 52 is supported on the wire tracks 56 for parallel sliding motion in the X direction between the left and right sides 46 and 44 respectively.

Caging the intersection of the ribs 50 and 52 is a slide or carriage 58 which consists of an upper plate 60 resting on top of ribs 50 and 52 and a lower plate 62 supported beneath both ribs 50 and 52. The plates 60 and 62 are held in their spaced relationship by the four pins 64 caging or bracketing the ribs 50 and 52. A magnet 66 is secured on top of the upper plate 60. The rib 50 is moved to and fro by the cable 68, illustrated for clarity by dot-dash lines. The cable 68 is secured by snubbers 70 and 72 at the respective ends of the rib 50. Starting with snubber 72, it will be seen that the cable 68 runs through the eyelet or pulley 74 through the guide 76, mounted on the pillar 77 secured on the bottom 42, thence through the eyelet or pulley 78, around the bottom of the driven spool 80 (around which it makes several windings for security) and back from the top of the spool to the eyelet 78, thence to the snubber 70, through the eyelet 79, through the guide 76, the eyelet 82, finally returning to the snubber 72. It will thus be seen that clockwise rotation of the spool 80, as viewed in FIG. 4, will move the rib 50 to the left. It will take up the pass 84 drawing the snubber 70 and the pass 86 to the left and consequently will draw the pass 88 toward the eyelet 82 and move the pass 90 to the left. The pass 92 will move toward the eyelet 74 drawing out the pass 94 from the bottom of the spool 80. Counter-clockwise movement of the spool 80 will, of course, achieve the opposite movement and move the rib 50 to the right.

Figure 4:
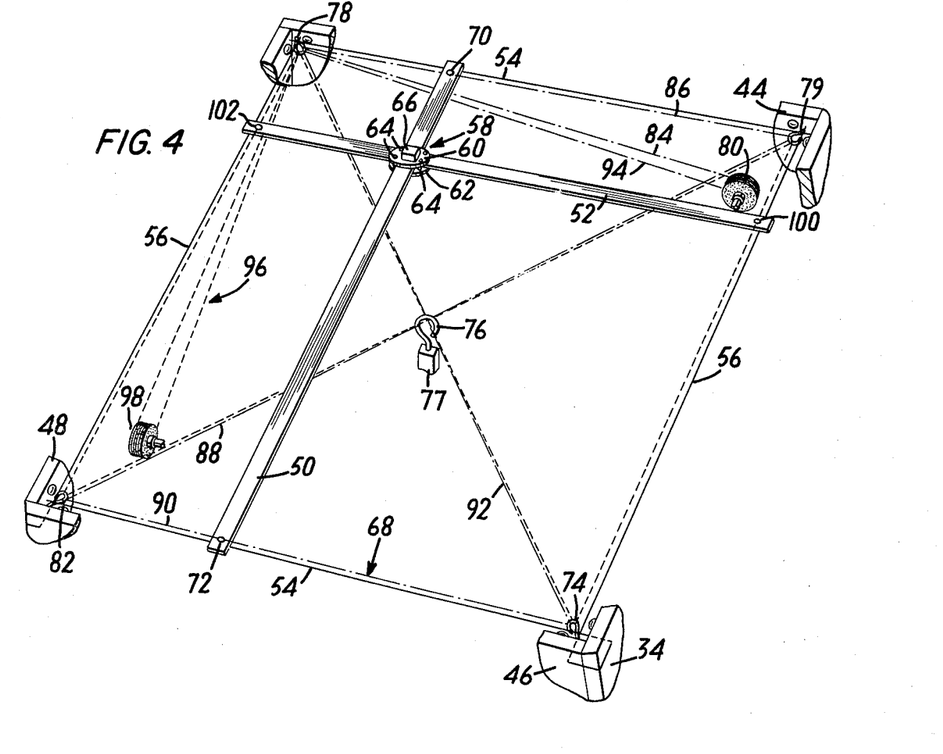
FIG. 4 is a plan view of the operative X and Y co-ordinates and their driving connections.

In like fashion, the cable 96 about the spool 98 will move the rib 52 in a parallel movement toward and away from a side 46 (44). Cable 96, for clarity, is illustrated by dash-dash lines. A detailed description of the paths of the cable 96 is not deemed necessary but it will be understood that cable 96 passes through the corner eyelets 74, 82, 78 and 79 and is snubbed to the rib 52 by the snubbers 100 and 102 respectively.

As the ribs 50 and 52 move independently, by the rotation of the spools 80 and 98, respectively, the magnet 66 on the slide 58 will always remain over the locus of the intersection of the axis of the ribs 50 and 52.

Figure 5:
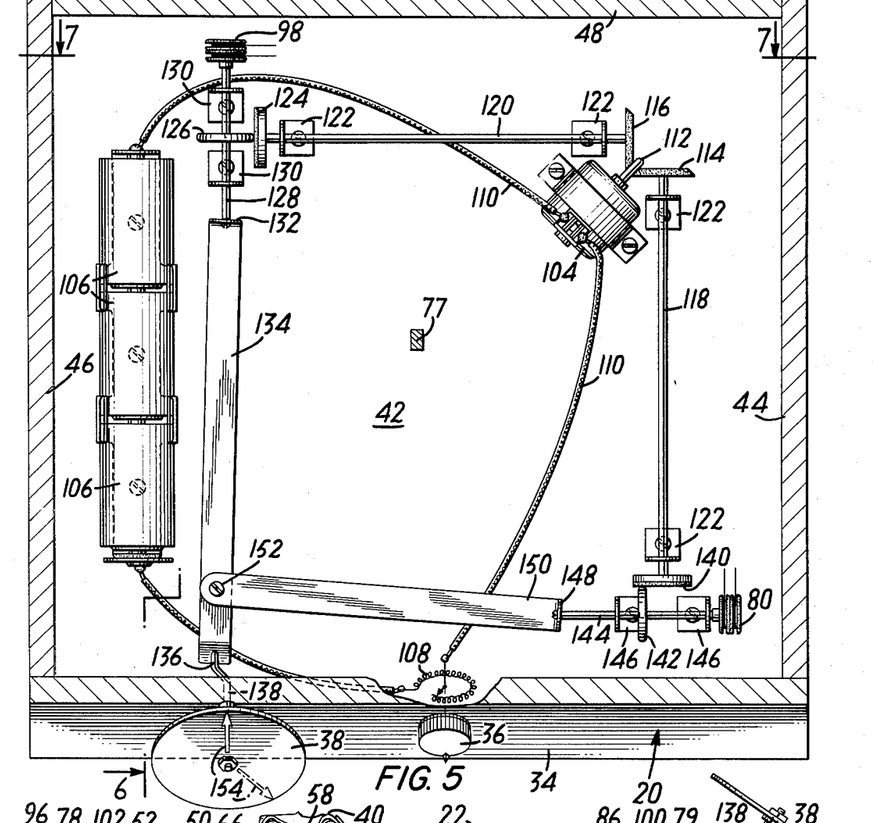
FIG. 5 is a plan view for the control means of the drive for X and Y coordinates.
Figure 6:
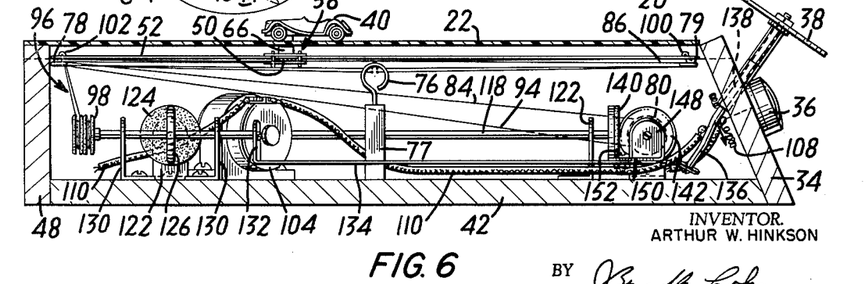
FIG. 6 is a sectional elevation taken on the line 6—6 of FIG. 5.
Figure 7:
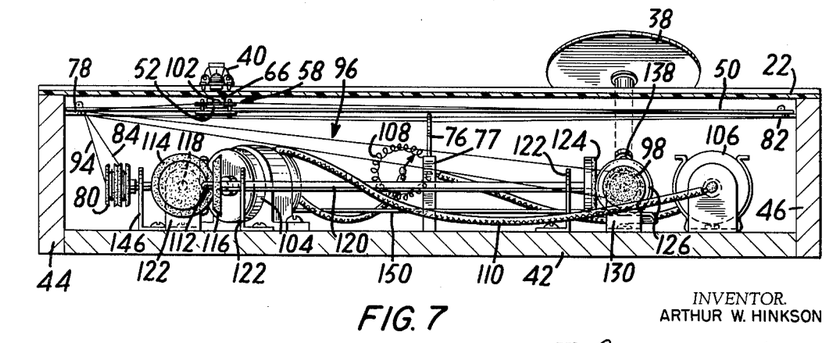
FIG. 7 is a sectional elevation taken on the line 7—7 of FIG. 5.

Conveniently positioned beneath the plane of movement of the ribs 50 and 52 and secured to the bottom 42 is an electric motor 104 powered by the batteries 106 controlled through the rheostat 108 and across power cables 110, as clearly illustrated in FIG. 5. Rotation of the rheostat knob 36 controls power to the motor 104 and consequently the speed of the motor.

The drive shaft 112 of motor 104 is in frictional driving engagement with the beveled friction discs 114 and 116 keyed on the rotating shafts 118 and 120, supported in suitable bearing 122. Rotation of the shaft 120 rotates friction disc 124 secured thereto. The friction disc 124 is engaged by a friction wheel 126 secured on a rotating shaft 128 slidably journalled in bearings 130 and loosely journalled in a flange 132 of a link 134 connected at its other end to a crank 136 whose shaft 138 is angularly journalled through the front side 34 of the housing 20. Keyed to the shaft 138 is the steering wheel 38. Because of the angular position of the shaft 138 (see FIG. 6), rotation of the steering wheel will cause an axial movement of the link 134 a distance equal to the horizontal projection of the crank throw. This movement is transferred to shaft 128 and the wheel 126 is moved across the face of the disc 124 causing the wheel 126 to be moved in opposite directions at the extremes of the throw and to be stationary at the midpoint of the throw.

The shaft 128 has secured to it the spool 98 and all rotary motion of the wheel 126 is thereby transferred to the spool 98. As heretofore explained, rotation of the spool 98 causes movement of the rib 52.

Shaft 118 carries at its forward end a friction disc 140 engaged by a friction wheel 142 secured on a shaft 144 journalled in the bearings 146 and the flange 148 of a link 150. At its other end, it is pivoted at 152 to the link 134 where it receives the left and right components of the throw of crank 136. This, in turn, is transferred axially through the shaft 144 to the friction wheel 142 to move that wheel across the face of the friction disc 140 so that the rotation of the wheel 142 is reversed in the extremes of the throw and the wheel is stationary at the central point of the throw. Rotary motion of the wheel 142 is transmitted to the spool 80 which controls the movement in the Y direction of the Y coordinate rib 50. As illustrated in FIG. 5, the crank 136 is in the position of extreme left-hand throw and neutral front and back throw, hence wheel 142 is shown in its maximum position to the left and wheel 126 in its center or neutral position.

It may be seen that the movement of the links 134 and 150 by the crank 136 is so phased that when the wheel 38 is in a certain position, designated in FIG. 5 by the dotted line arrow, the rib 52 of X coordinate is moved to the right and the rib 50 of Y coordinate is moved to the front. When the wheel is in this position, the magnet 66 is driven to the front right-hand corner of the housing 20.

In this regard, it should be noted that when either of the ribs 50 or 52 is driven to its extreme in any direction, slippage will occur between the respective frictional drive members 124, 126 or 140, 142 as the case may be. Thus when the arrow 154 is at the selected dotted line position, the magnet 66 will be driven to the lower right-hand corner, that is the rib 50 will move as far forward as possible within the housing 20 and the rib 52 as far to the right as possible within the housing 20. The rib reaching the end of its travel first is stalled by slippage of its drive means until the other rib reaches the end of its travel whereupon both driving couples (124 and 126, 140 and 142) will be slipping.

The purpose of the arrow 154 is to provide an indicator for a homing point for the magnet which, in the operation of the apparatus is, of course, not visible to the operator.

Figure 16:
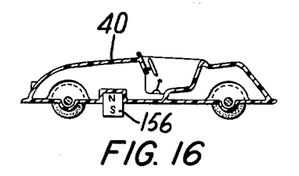
FIG. 16 is a sectional elevation of a vehicle which may be used in any of the embodiments of the invention.

Referring now to FIG. 16, there is shown a small vehicle 40 having mounted in its bottom a magnet 156 whose polarity is arranged to be attracted by a magnet 66. As illustrated in FIG. 16, the magnet has its south pole at the bottom. Accordingly, the magnet 66 will in such case require its north pole at the top. Other known arrangements may be employed.

Returning now to FIG. 1, the vehicle 40 is placed on the starter point 158 and the wheel 38 is rotated so the arrow 154 reaches the dotted line position. The magnet 66 will move beneath the point 158 establishing effective magnetic coupling with the vehicle 40. Rotation of the wheel 38 will then, through the means heretofore described, move the magnet to an infinity of positions beneath the cover plate 22 established by the X and Y coordinate movements of the ribs 50 and 52.

Figure 8:
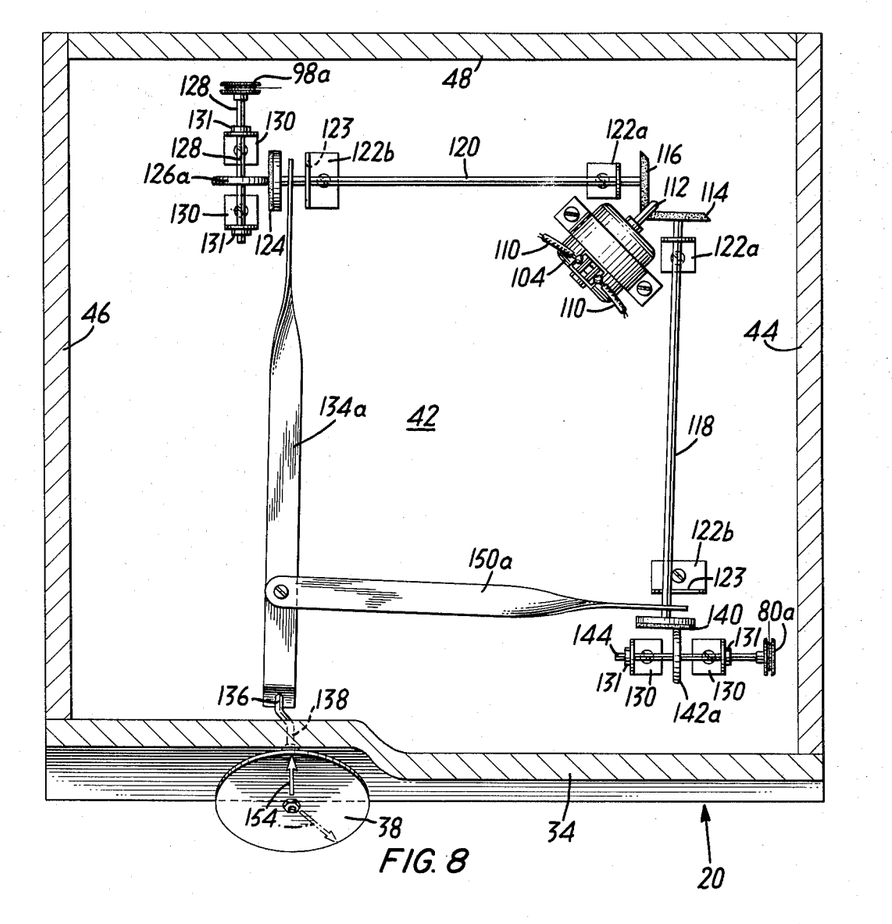
FIG. 8 is a plan view of a variation or other embodiment of the control means of the drive for the X and Y coordinates.

FIG. 8 illustrates another embodiment for driving the spools 98 and 80, here designated 98a and 80a. In this embodiment, no motion is applied to the spools axially and they are limited by washers 131 solely to rotary motion. The links 134a and 150a correspond in function and movement to the links 134 and 150 but instead of varying the position of the wheels 126a and 142a, the shafts 118 and 120 are moved about their bearings 122a respectively in the slot 123 of the bearing 122b so that the friction discs 124 and 140 are moved across the wheels 126a and 142a respectively.

In certain structures, particularly very large structures, the embodiment of FIG. 8 may prove advantageous over the embodiment of FIG. 5 by reason of the stationary position of the rotating spools 80a and 98a. This is true because the cables 68 and 96 in some embodiments may lack sufficient elasticity to compensate for the axial movement of the spools in the FIG. 5 embodiment.

In some models of my apparatus, I have found that the cables 68 and 96 may be formed of nylon thread. In such construction, the axial movement of the spools 80 and 98 is without significance. In the case of a very large embodiment, steel wires, which might be employed as cables in the FIG. 8 embodiment, would prove advantageous.

It will be appreciated in the embodiments illustrated in FIGS. 1 to 8 that turning motion of the vehicle may be obtained only by continued turning motion of the wheel 38. Whenever the wheel 38 is stationary, the vehicle will move in a straight line direction corresponding to the position of the indicating arrow on the wheel 38. While this is very entertaining, it does not simulate the operation of a wheeled vehicle which will remain in a turn until the wheel is "straightened."

Figures 12, 13, 14:
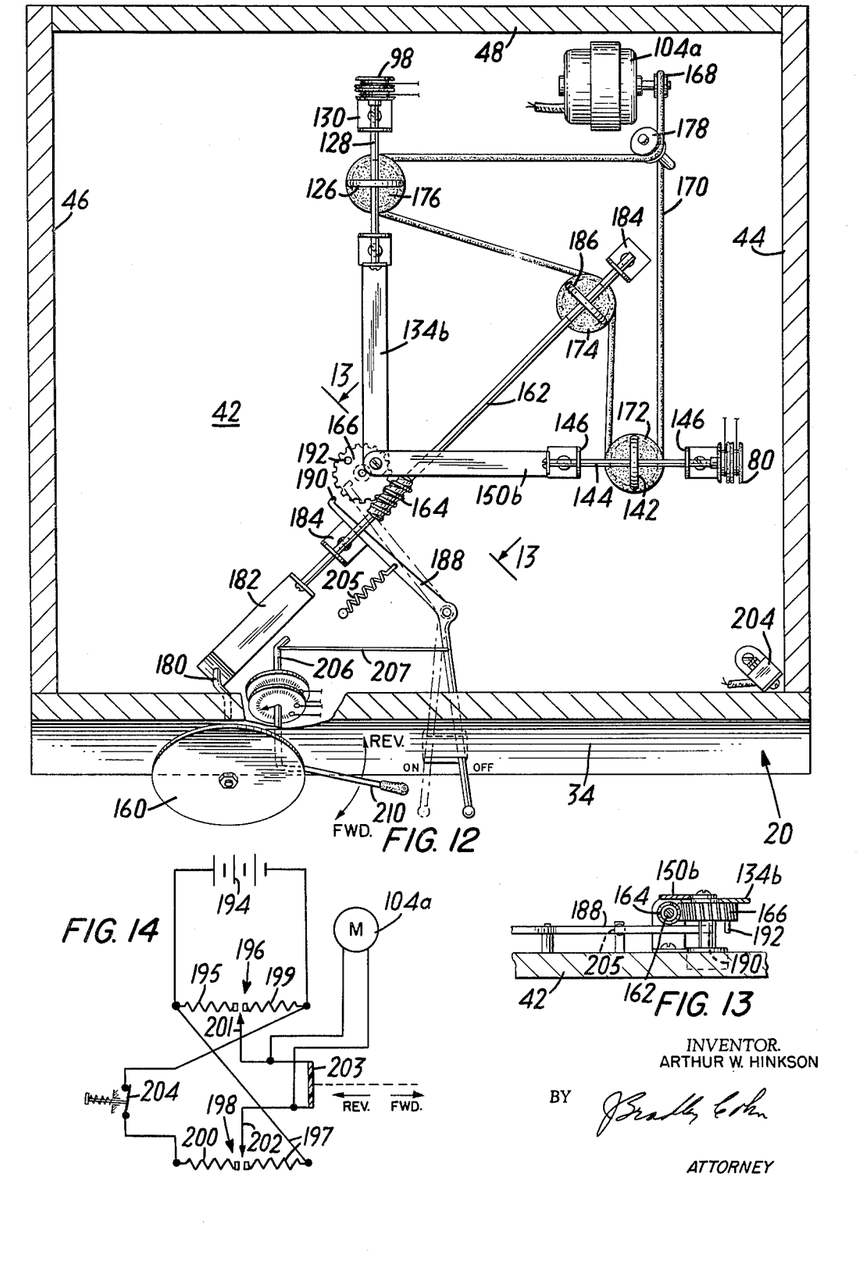
FIG. 12 is a sectional plan view of an embodiment of the invention providing means for more completely simulating the operation of a land vehicle for steering, stopping, reversing, accelerating and decelerating.
FIG. 13 is a sectional elevation taken on line 13—13 of FIG. 12.
FIG. 14 is a schematic diagram illustrating the electrical circuity for the simulated throttle of the embodiment shown in FIG. 12.

Referring now to the embodiment illustrated in FIG. 12, the wheel 160 simulates quite precisely the steering wheel in a wheeled vehicle. That is to say, the operation of the steering wheel 160 produces guidance in the vehicle 40 substantially identical to the guidance produced by conventional steering wheels in conventional wheel vehicles. This result is produced because the shaft 162 is differentially and selectively driven by the motor 104a so that the worm 164 on shaft 162 selectively rotates the crank gear 166. It will be seen that the gear 166 is quite analogous in function to wheel 38 of the embodiment shown in FIG. 5. That is to say, that the links 134b and 150b received a similar reciprocating motion from crank gear 166 as the links 134 and 150 of the FIG. 5 embodiment receive from crank 136. Reciprocation of these links causes selectively, backward, forward or no motion on the spool 98 and 80, respectively, by varying the relation of wheels 142 and 126 across the faces of discs 172 and 176 respectively in a manner that may now be understood by reference to FIG. 5 heretofore described.

The drive connections from the motor 104a are as follows:

The pulley 168 drives a belt 170 running around pulley discs 172, 174, 176 and pulley 178. Rotation of the steering wheel 160 from its "straight" position by virtue of its crank 180 reciprocates the link 182 and with it shaft 162 slidably mounted in its bearings 184. The driven wheel 186 secured on the shaft 162 is then rotated by the pulley disc 174 in one or the other direction, thereby driving the crank gear 166 from the worm 164 in a direction that will cause a continuing turning motion of the vehicle. When the wheel 160 is rotated so that the crank 180 is rotated in the direction of the farthest opposite throw, rotational movement of the wheel 186 is reversed and together with it rotation of the worm 164 and the gear 166. The vehicle then has a continuous turning motion in the opposite direction. It should be noted that the axial movement of worm 164 by crank 180 initiates the correct rotary movement of the crank gear 166 thereby eliminating sluggishness in the beginning of the turning movements.

With the wheel 160 in a neutral or straight position, i.e., with the crank 180 intermediate the extremes of throw so that the wheel 186 rides over the center of the disc 174, no motion is imparted to the gear 166 and the vehicle is moved continuously in a straight direction within the limits of the X and Y coordinates.

As further illustrated in FIG. 12, there is shown a means for homing the driven magnet 66 to the starting point 158. A homing pawl lever 188 when placed in the dotted line position (indicated as ON) moves its tip 190 across the face of the gear 166 and into the path of a pin 192 (see FIG. 13). The device is so arranged that when the pin 192 of the gear 166 is in engagement with the tip 190, the links 134b and 150b are in a position analogous to the position of the links 134 and 150 when the wheel 38 is positioned with its arrow 154 in the dotted line position. Thus by means heretofore explained, the X and Y coordinates move the driven magnet to the front right-hand corner of the device.

There is further illustrated in FIGS. 12 and 14, an electrical arrangement for controlling the speed of the vehicle, forward and reverse direction of the vehicle and/or an arrangement for automatically controlling the entry and exit of the vehicle into and out of the homing corner.

Referring first to FIG. 14, a source of direct current 194 is connected on one side to portion 195 of an open center rheostat 196 and also to portion 197 of an open center rheostat 198. The other side of source 194 is connected to portions 199 and 200 of rheostats 196 and 198 respectively. The motor 104a is connected across rheostat arms 201 and 202 mechanically connected to each other by the insulating rheostat arm shaft 203. A micro switch or trip 204 breaks the connection to portion 200 of rheostat 198. As indicated in FIG. 14, this portion is operative when the rheostat arms 201 and 202 are in the "reverse" position. Shaft 203 is operated by power lever 210.

With lever 210 in the center position, the arms 201 and 202 are at the center break of rheostats 196 and 198 and no current is applied to motor 104a.

As lever 210 is moved through the "forward" motion, increasing power is supplied to motor 104a rotating in the direction of one hand. As the lever is moved through the "reverse" segment, the power to the motor increases rotating it in the direction of the opposite hand.

With the homing pawl lever 188 in the ON position and the power lever 210 in the reverse position, the vehicle (or magnet 66) is, as previously described, moved to the front right-hand corner to open micro switch 204 cutting off current to motor 104a. Reversal of power lever 210 to the "forward" position will apply reversing power to motor 104a to bring the magnet (with couple vehicles) out of the corner. It would then home to the rear left-hand corner, except that the operator may free his controls by moving homing pawl lever 188 to the "OFF" position.

Additionally, there is shown in FIG. 12, a means for automatically operating lever 188 from lever 210. A tension spring 205 secured to lever 188 and anchored to the bottom 42 of box 20 urges the lever to the OFF position. A crank extension 206 on rheostat shaft 203 is connected by a cable 207 to lever 188 to drive the lever 188 to the ON position. The length of cable 207 is such that it operates the lever 188 only when control 210 is moved to the extreme reverse position. This will automatically home magnet 66 at high speed when control 210 is moved to its extreme reverse position.

Figure 17:
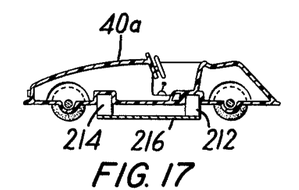
FIG. 17 is a sectional elevation of a modified vehicle particularly adapted to forward and reverse movement.

In FIG. 17, there is shown a vehicle 40a having a pair of magnets 212 and 214 spaced fore and aft and connected by a slide strip 216 of magnetic material. It should be noted that magnets 212 and 214 may be a single solid magnet provided the polarity is vertical. Employing vehicle 40a in the embodiment of FIGS. 12–14, the driven magnet 66 slides fore and aft or vice versa, when lever 210 is moved from Forward to Rearward or vice versa thereby simulating forward and reverse motion on the vehicle. The same effect with skill may be obtained with respect to the vehicle 40 shown in FIG. 16. However, the vehicle tends to rotate about the magnet 66 so that it is always going forwardly.

Figure 9:
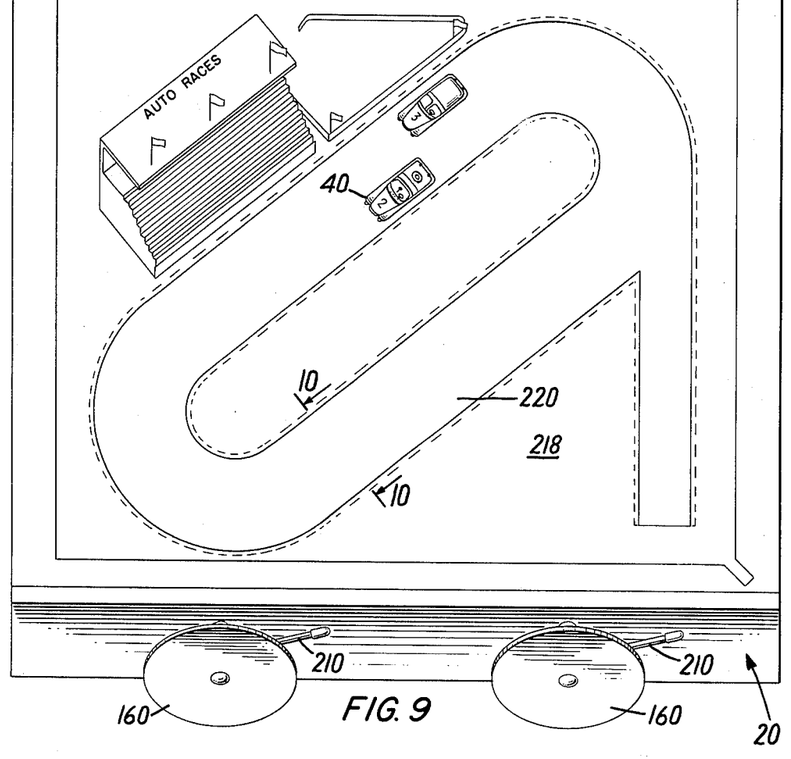
FIG. 9 is a perspective plan view of an embodiment in which the control means are duplexed to provide a competitive game for two persons.
Figure 10:
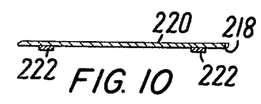
FIG. 10 is a sectional fragment taken on the line 10—10 of FIG. 9 showing metal strips limiting the vehicles drive to the race track.

FIGS. 9 and 10 disclose two modifications of the invention for achieving a definite course from which the auto may not escape by loss of control and for providing a competitive game in such a setup.

The board 218 is provided with indicia to indicate a race track 220. The underside of the board carries magnetically conductive strips 222 so that the car will lose magnetic coupling with the magnet 66 when passing over the strip 222. Thus if the car is driven off the track the racer is in fact incapacitated since contact with the controllable magnet 66 is lost.

It will be understood by consideration of FIG. 4 the machine may be duplexed by positioning one set of coordinates 50, 52 in a lower plane than the other set. In such a configuration, the upper magnet 66 is better placed below its carriage 58 so that both magnets are in the same plane. It will be understood that a collision of the two magnets 66 is not a problem since the vehicles would be in arrested collision. The operating motors, spools and links may all be placed on the same plane on bottom 42. The eyelets are better placed on relatively spaced horizontal planes. Conveniently, the control wheels 160 may be positioned on opposite sides if desired.

Figures 11, 15:
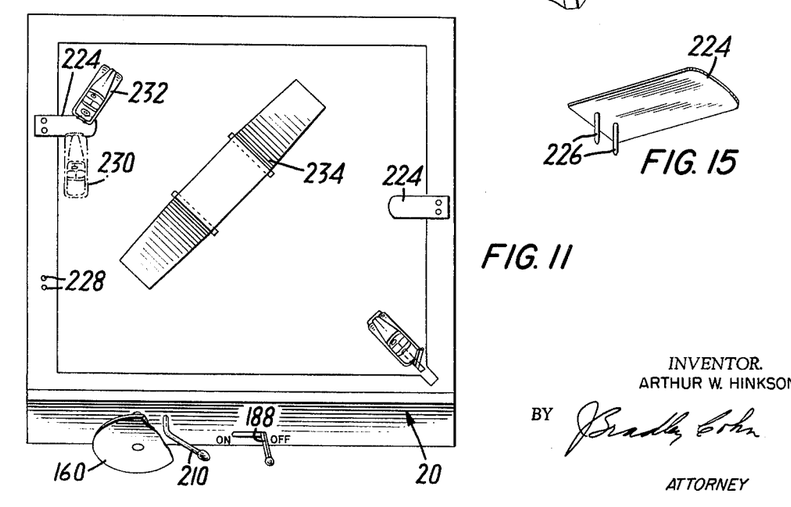
FIG. 11 is an embodiment of the invention in which means are provided for parking a vehicle and transferring the drive to another vehicle at the will of the operator.
FIG. 15 is a detailed showing of one of the parking tabs shown in FIG. 11.

Referring to FIGS. 11 and 15, the removable parking tabs or strips 224 may be made of any substance, preferably a substance such as cardboard, although metal is quite permissible. These strips 224 are provided with pegs 226 which fit in complementary holes 228. In operation, the automobile 230 may be driven up to a strip as indicated in dotted lines. The strip will hold the automobile against the movement of the magnet and the magnet may be moved over to the vehicle 232 which may be then operated across the board. This permits the placement of several vehicles, such as a fire engine, a tank and a pleasure car on the board at one time with selective operation of each in turn.

With reference to FIG. 11 there is also shown the operation of an automobile over and under the overpass 234. It has been found that with a reasonably good magnet 66 and 156 the automobile does not lose contact passing over the overpass within reasonable limitation.

Figure 18:
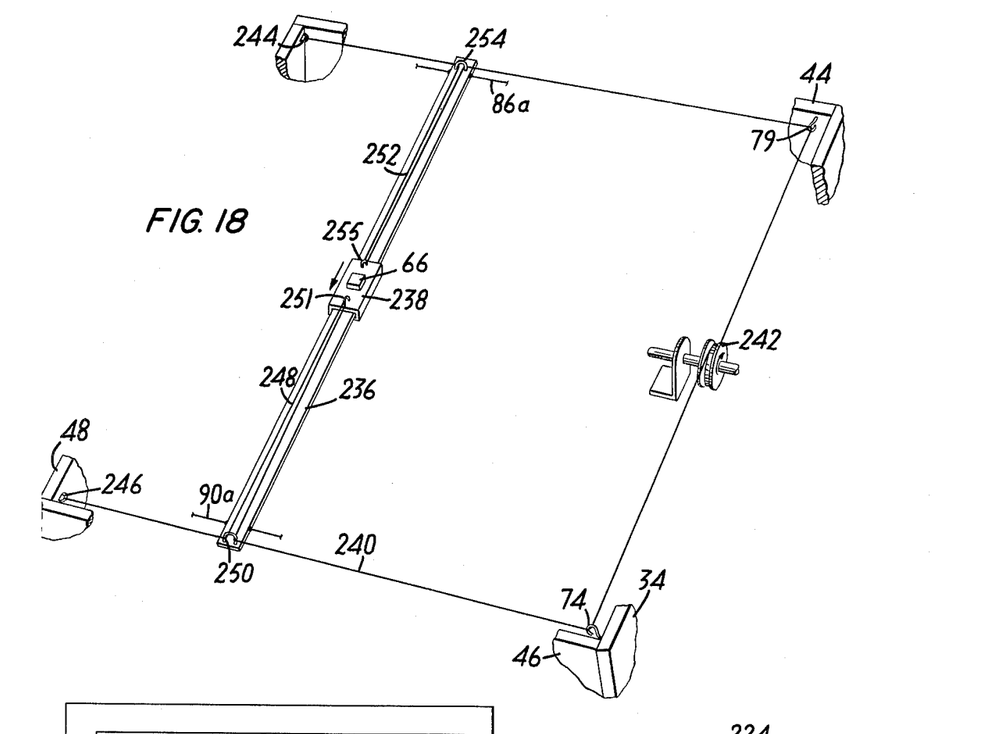
FIG. 18 is a schematic plan view of another embodiment for moving the X and Y coordinates.

Referring now to FIG. 18, a variable embodiment of the invention is illustrated. In this structure, the coordinate X and Y motions occur on one movable rib 236 having slidably secured on it carriage 238 carrying a magnet 66. Cables 86a and 90a corresponding to cable lines 86 and 90 of FIG. 4 cause parallel movement of the rib 236 in the Y direction, while the cable 240 operated from the pulley 242 slides the slide carriage 238 in the X direction. Cables 86a, 90a and 240 may be operated by either the mechanism illustrated in FIG. 5 or the mechanism illustarted in FIG. 8. Further illustration of these mechanisms is not deemed necessary. It will be apparent that the motion of the rib 236 is identical to the motion of either one of the ribs in FIG. 4. The motion of the carriage 238 is as follows:

The cable 240 is anchored at its ends at 244 and 246 and hence rotary motion of the pulley 242 in the direction of the arrow will cause a relative shortening of the loop 248 of cable 240 looped through the eye 250 and passing freely through the eye 251 and a corresponding lengthening of the loop 252 formed by passing through the eye 254 and freely sliding through the eye 255. This will move the carriage 238 in the direction of its adjacent arrow. Reverse rotation of the pulley 242 will produce a reverse movement of the carriage 238. As shown in FIG. 18, the rib 236 is also supported by cable 240 in its passage through the eyes 250 and 254. It is quite evident that it may be supported by a stationary track such as the wire tracks 54 or 56 illustrated in FIG. 4 if that should prove necessary or desirable.

I claim:
1. An amusement device comprising a source of power, a first driven clutch member, a second driven clutch member, mechanism connecting said source of power to each of said driven clutch members, a carriage, traveling support means for moving said carriage in the direction of an X coordinate, traveling support means for moving said carriage in a Y coordinate direction, means operative when driven to reciprocate said carriage along one coordinate, other means operative when driven to reciprocate said carriage along a different coordinate and a unitary control member to selectively and differentially engage said mechanism with said first named clutch member and said other means with said second named clutch member whereby said carriage may be selectively reciprocated on each of said coordinates.

2. A device substantially as set forth in claim 1 and further characterized by a magnetic instrumentality on said carriage, a vehicle, means supporting said vehicle along a plane parallel to and spaced from the plane of movement of said X and Y coordinate support means, said vehicle having at least a portion thereof magnetically responsive to said magnetic instrumentality on said carriage, whereby movement of said carriage will move said vehicle along its said supporting plane.

3. A device substantially as set forth in claim 1 and further characterized in that said carriage is slidably mounted for movement along a rib in the direction of one coordinate and that said rib is slidably mounted for sidewise movement in the direction of said other coordinate.

4. A device substantially as set forth in claim 1 and further characterized by a trip positioned at a preselected locus in the travel of said carriage, said trip being constructed and arranged to disable said power source when contacted by said carriage, and driving means selectively connectable to said control member to activate said control member to move said carriage to said trip.

5. A pair of ribs transversely positioned in a plane and slidably supported at their ends for sliding sidewise motion, one of said ribs being slidable to and fro in a direction of X coordinate and the other of said ribs being slidable to and fro in the direction of a Y coordinate, said ribs forming a point of intersection with each other in all positions of movement, a carriage straddling said intersection to move therewith, a continuously rotating clutch disc face, a clutch wheel engaging said face for frictional driving movement, means to selectively move at least one of said disc face and said wheel to produce relative movement of the rim of said wheel across the face of said disc so that said wheel at the extremes of such movement are driven in counter-directions and at the intermediate point of said movement makes point contact at the center of said disc face to produce no driving movement of said wheel, means drivingly connecting at least one of said wheels and said disc face to one of said ribs, a further pair of coacting disc face and wheel similarly constructed and arranged, means drivingly connecting one of said second wheel and said second disc face to the other of said ribs, and said aforementioned selective means being operative to selectively produce relative motion of said second disc face and wheel, whereby movement of said carriage may be selectively controlled.

6. A carriage, traveling support means for moving said carriage in the direction of an X coordinate, traveling support means for moving said carriage in a Y coordinate direction, first power driven means drivingly connected to said traveling support means of the X coordinate, and second power driven means drivingly connected to said traveling support means of the Y coordinate, power means, and means to selectively engage said power means to said first and second power driven means for selective and joint movement of said X coordinate support means and said Y coordinate support means, said means to selectively engage said power means to said first and said second power driven means comprising a pair of disc faces drivingly engaging wheels and said selective means producing relative movement of said wheels across the disc faces.

7. In a device substantially as set forth in claim 6 and further characterized by a stationary trip, positioned at a preselected locus in the travel of said carriage, said trip being constructed and arranged to disable said power means when contacted by said carriage.

References Cited by the Examiner

UNITED STATES PATENTS

| 2,663,967 | 12/1953 | Mathis | 46—240 |
| 2,743,024 | 4/1956 | Schmitt et al. | 212—24 |
| 2,806,323 | 9/1957 | Oback | 46—240 |

RICHARD C. PINKHAM, *Primary Examiner.*

FREDERIC B. LEONARD, *Assistant Examiner.*